(12) United States Patent
Kondoh et al.

(10) Patent No.: US 7,159,392 B2
(45) Date of Patent: Jan. 9, 2007

(54) ESTIMATION OF PARTICULATE MATTER DEPOSIT AMOUNT IN DIESEL PARTICULATE FILTER

(75) Inventors: Terunori Kondoh, Yokohama (JP); Junichi Kawashima, Yokosuka (JP); Makoto Ootake, Yokohama (JP); Masahiko Nakano, Machida (JP); Shouichirou Ueno, Yokohama (JP); Naoya Tsutsumoto, Yokohama (JP); Toshimasa Koga, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/200,050

(22) Filed: Aug. 10, 2005

(65) Prior Publication Data

US 2006/0032217 A1 Feb. 16, 2006

(30) Foreign Application Priority Data

Aug. 10, 2004 (JP) ............................. 2004-233191

(51) Int. Cl.
*F01N 3/00* (2006.01)

(52) U.S. Cl. ............................. 60/297; 60/274; 60/285; 60/295; 60/311

(58) Field of Classification Search ................. 60/274, 60/276, 277, 285, 286, 287, 291, 295, 297, 60/311
See application file for complete search history.

(56) References Cited

U.S. PATENT DOCUMENTS 6,758,039 B1 * 7/2004 Kuboshima et al. .......... 60/311
6,829,889 B1 * 12/2004 Saito et al. ................... 60/291
6,907,873 B1 * 6/2005 Hamahata .................... 123/676
6,966,178 B1 * 11/2005 Saito et al. ................... 60/295
7,065,960 B1 * 6/2006 Gioannini et al. ............ 60/295
7,086,220 B1 * 8/2006 Imai et al. .................... 60/274

FOREIGN PATENT DOCUMENTS

JP 2003-166411 A 6/2003

* cited by examiner

*Primary Examiner*—Binh Q. Tran
(74) *Attorney, Agent, or Firm*—Foley & Lardner LLP

(57) ABSTRACT

This invention relates to estimation of a particulate matter deposit amount in a diesel particulate filter (1) provided in an exhaust passage (7) of a vehicle diesel engine (10). When the vehicle speed exceeds a predetermined vehicle speed, a differential pressure method, in which the particulate matter deposit amount is estimated based on the differential pressure upstream and downstream of the filter (1), is applied, and when the vehicle speed does not exceed the predetermined vehicle speed, an accumulation method, in which the particulate matter deposit amount is estimated by accumulating an increment determined from the load and rotation speed of the diesel engine (10), is applied. When switching from the differential pressure method to the accumulation method, the particulate matter deposit amount determined in the differential pressure method is used as an initial value of the accumulation, and thus the particulate matter deposit amount can be determined accurately.

18 Claims, 8 Drawing Sheets

ESTIMATION OF PARTICULATE MATTER DEPOSIT AMOUNT IN DIESEL PARTICULATE FILTER

FIELD OF THE INVENTION

This invention relates to a diesel particulate filter which traps particulate matter discharged by a diesel engine, and more particularly to estimation of a particulate matter deposit amount in the filter.

BACKGROUND OF THE INVENTION

To trap particulate matter contained in the exhaust gas of a diesel engine, a diesel particulate filter (abbreviated to DPF hereafter) provided in an exhaust passage of a diesel engine causes the exhaust gas to pass through porous filter material such that the particulate matter is deposited on a wall surface of hole portions of the filter material. As the deposit amount increases, the exhaust gas flow resistance of the DPF rises and the particulate matter trapping capability of the DPF decreases. When the particulate matter deposit amount reaches a predetermined amount, the temperature of the exhaust gas is raised to burn the deposited particulate matter in the DPF and thereby remove the particulate matter from the DPF. This process is generally referred to as DPF regeneration.

The amount of deposited particulate matter in the DPF can be detected from the differential pressure of the exhaust gas upstream and downstream of the DPF. However, the differential pressure varies according to the flow rate of the exhaust gas passing through the DPF, and the detection precision of a differential pressure sensor which detects the differential pressure may also vary under the influence of variation in the exhaust gas flow rate.

SUMMARY OF THE INVENTION

JP2003-166411-A, published by the Japan Patent Office in 2003, proposes raising the differential pressure detection precision of a differential pressure sensor by correcting the output of the differential pressure sensor on the basis of the rate of change in the exhaust gas flow rate.

A differential pressure sensor has a characteristic whereby the error increases as the exhaust gas flow rate decreases. The correction performed in the prior art, which is dependent on the rate of change in the exhaust gas flow rate, does not correspond to differences in the exhaust gas flow rate itself. Hence, when the prior art is applied to a diesel engine for driving a vehicle, for example, the differential pressure detection error inevitably increases while the vehicle is traveling at low speed.

This increase in the differential pressure detection error reduces the precision of a determination of the DPF regeneration timing, and if the DPF regeneration frequency increases as a result, the fuel consumption of the diesel engine rises.

It is therefore an object of this invention to estimate a particulate matter deposit amount in a DPF accurately, and optimize the regeneration timing of the DPF.

In order to achieve the above object, this invention provides an estimation device which estimates a particulate matter deposit amount in a diesel particulate filter provided in an exhaust passage of a diesel engine for a vehicle. The device comprises a differential pressure sensor which detects a differential pressure between an exhaust gas pressure in the exhaust passage upstream of the filter and an exhaust gas pressure in the exhaust passage downstream of the filter, a sensor which detects a running condition of the diesel engine, a sensor which detects a parameter associated with an exhaust gas flow rate in the filter, and a programmable controller. The controller is programmed to estimate the particulate matter deposit amount in the filter by applying a first estimation method in which the particulate matter deposit amount is estimated on the basis of the differential pressure, and a second estimation method in which a periodical increment in the particulate matter deposit amount is calculated on the basis of the running condition and the particulate matter deposit amount is calculated by accumulating the increment, selectively in accordance with the parameter, and set the particulate matter deposit amount estimated in the first estimation method as an initial value for starting accumulation when applying the second estimation method.

This invention also provides an estimation method which estimates a particulate matter deposit amount in a diesel particulate filter provided in an exhaust passage of a diesel engine for a vehicle. The method comprises detecting a differential pressure between an exhaust gas pressure in the exhaust passage upstream of the filter and an exhaust gas pressure in the exhaust passage downstream of the filter, detecting a running condition of the diesel engine, detecting a parameter associated with an exhaust gas flow rate in the filter, estimating the particulate matter deposit amount in the filter by applying a first estimation method in which the particulate matter deposit amount is estimated on the basis of the differential pressure, and a second estimation method in which a periodical increment in the particulate matter deposit amount is calculated on the basis of the running condition and the particulate matter deposit amount is calculated by accumulating the increment, selectively in accordance with the parameter, and setting the particulate matter deposit amount estimated in the first estimation method as an initial value for starting accumulation when applying the second estimation method.

The details as well as other features and advantages of this invention are set forth in the remainder of the specification and are shown in the accompanying drawings.

DESCRIPTION OF THE PREFERRED EMBODIMENTS

Figure 1:
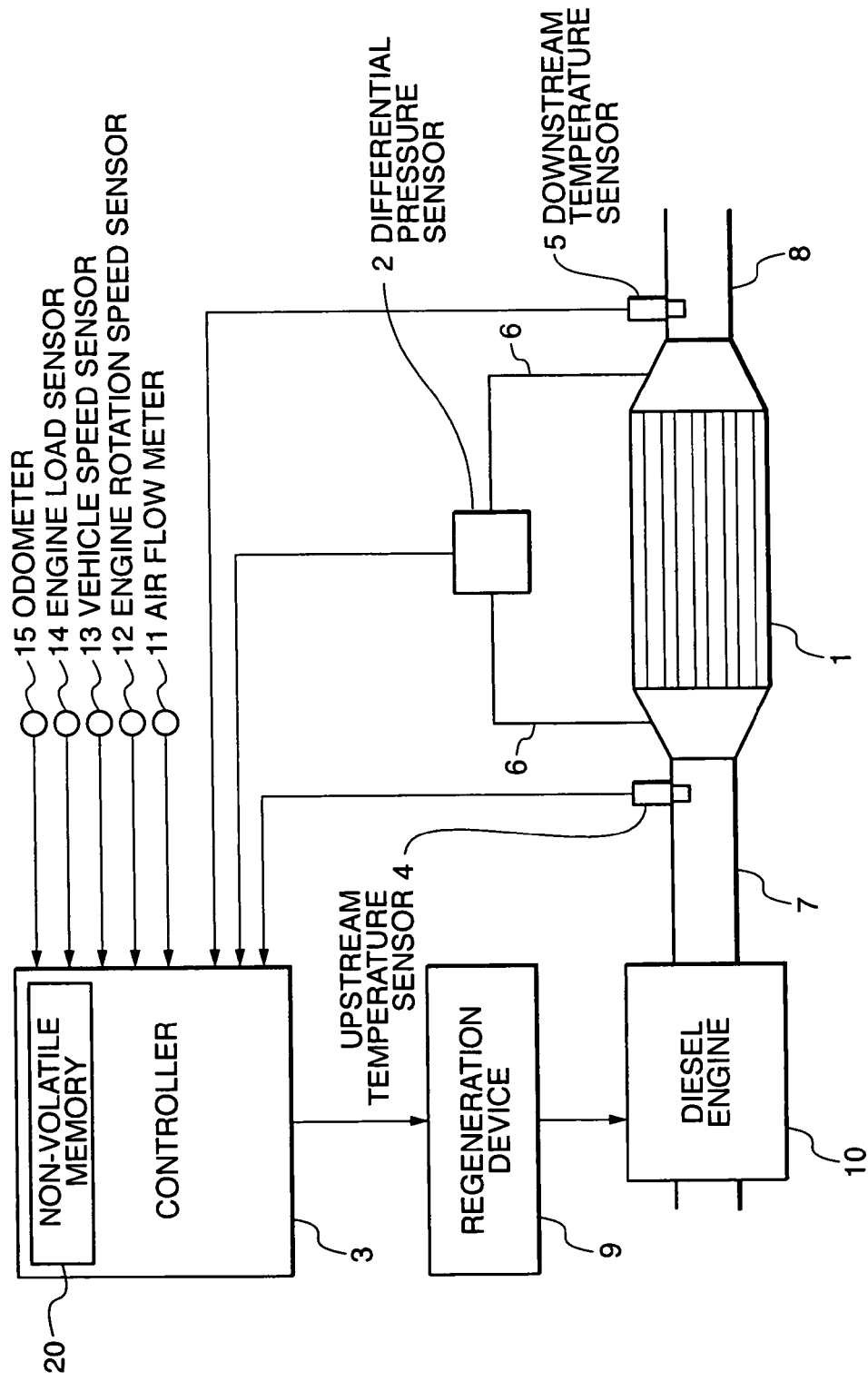
FIG. 1 is a schematic block diagram of a particulate matter deposit amount estimation device according to this invention.

Referring to FIG. 1 of the drawings, a diesel engine 10 comprises an exhaust passage 7. A DPF 1 is provided along the exhaust passage 7. The DPF 1 causes exhaust gas in the exhaust passage 7 to pass through a porous filter material such that the particulate matter in the exhaust gas is deposited in the DPF 1. The exhaust gas, from which the particulate matter has been removed, is discharged to the air from the DPF 1.

When the particulate matter deposit amount in the DPF 1 reaches a predetermined amount, a controller 3 outputs a regeneration signal to a regeneration device 9, whereupon the regeneration device 9 raises the temperature of the exhaust gas in the diesel engine 10 to burn the particulate matter deposited in the DPF 1.

To raise the temperature of the exhaust gas in the diesel engine 10, a method employing fuel injection control, such as retardation of the fuel injection timing, post-injection, and so on, and a method of heating the exhaust gas using a heating device may be applied.

When the former method is applied, the regeneration device 9 is constituted by a fuel injection device, and when the latter method is applied, the regeneration device 9 is constituted by a heating device. DPF 1.

This estimation is performed by applying two estimation methods, namely a differential pressure method and an accumulation method to be described below, selectively in accordance with the running conditions of the diesel engine 1.

Figure 8:
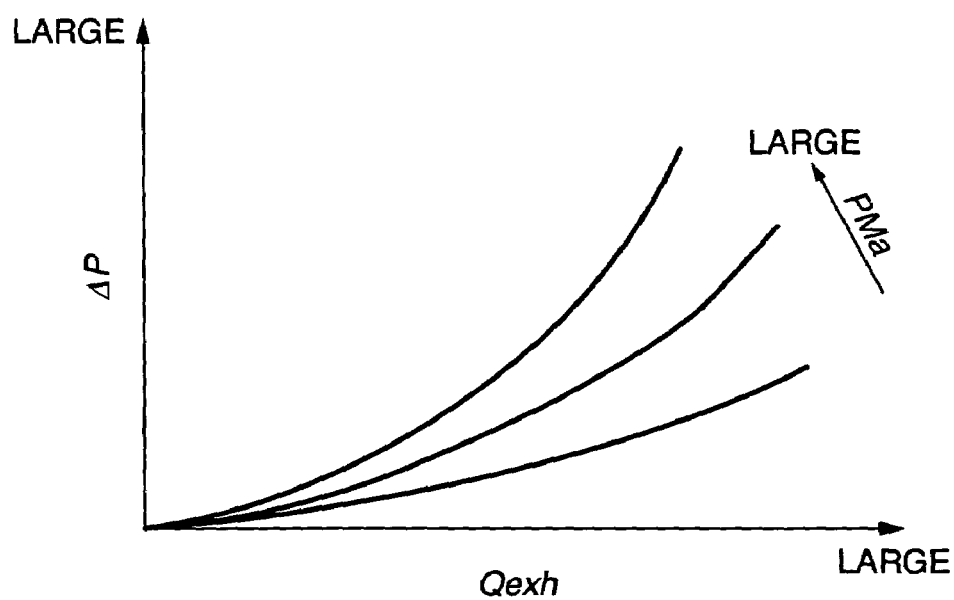
FIG. 8 is a diagram illustrating the characteristics of a map of a particulate matter deposit amount, which is used in the differential pressure method.

The differential pressure method is a method of estimating the particulate matter deposit amount from the differential pressure $\Delta P$ upstream and downstream of the DPF 1. As shown in FIG. 8, the particulate matter deposit amount in the DPF 1 may be expressed as a function having the differential pressure $\Delta P$ upstream and downstream of the DPF 1 and an exhaust gas flow rate Qexh of the DPF 1 as parameters. When the exhaust gas flow rate Qexh is constant, the differential pressure $\Delta P$ rises in accordance with increases in the particulate matter deposit amount. Hence, the particulate matter deposit amount can be determined from the differential pressure $\Delta P$ and exhaust gas flow rate Qexh using a map having characteristics such as those shown in FIG. 8, which defines in advance the relationship between the exhaust gas flow rate Qexh and differential pressure $\Delta P$ in relation to a plurality of different particulate matter deposit amounts. This estimation method will be referred to as the differential pressure method.

The exhaust gas flow rate Qexh is calculated from the intake air flow rate, detected by the air flow meter 11, the exhaust gas temperature inside the DPF 1, the differential pressure $\Delta P$, and the fuel injection amount Q of the diesel engine 10. A method of calculating the exhaust gas flow rate Qexh using these parameters is well-known from U.S. Pat. No. 6,698,192. The exhaust gas temperature in the DPF 1 is determined as an average value of the temperatures detected by the upstream temperature sensor 4 and downstream temperature sensor 5.

The accumulation method is a method of calculating the particulate matter deposit amount by accumulating particulate matter deposit amounts per unit time, which is determined according to the running conditions of the diesel engine 10. The load and rotation speed of the diesel engine 10 are applied as the running conditions. The particulate matter deposit amount in the DPF 1 per unit time is calculated using a map having the characteristics shown in FIG. 9, which defines in advance the relationship between the load and rotation speed of the diesel engine 10 and the particulate matter deposit amount in the DPF 1 per unit time.

Figure 7:
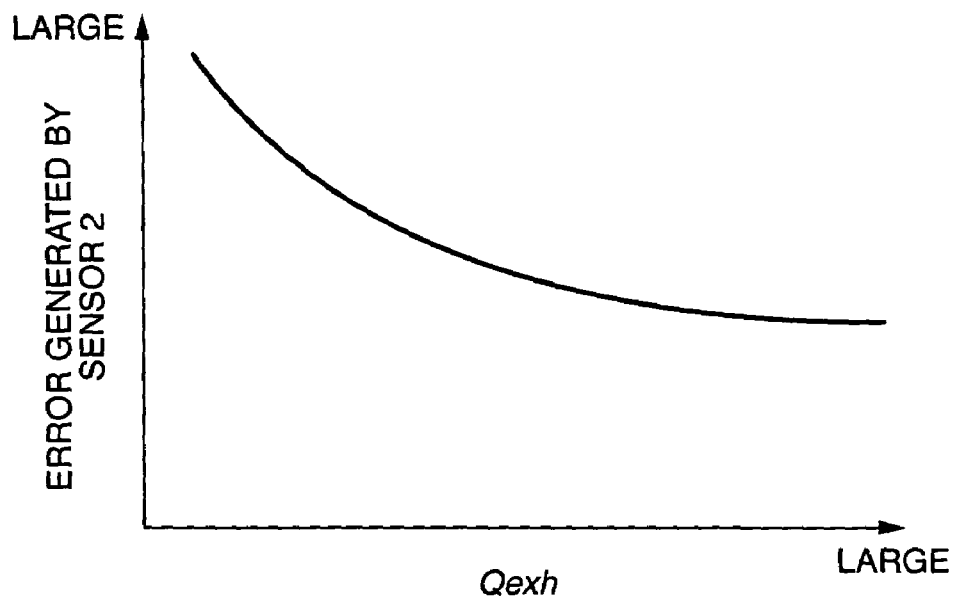
FIG. 7 is a diagram illustrating a relationship between a detection error of a differential pressure sensor and an exhaust gas flow rate.

Referring to FIG. 7, the error of the differential pressure sensor 2 which detects the differential pressure $\Delta P$ in the differential pressure method decreases steadily as the exhaust gas flow rate Qexh rises. Hence when the vehicle travels at a low vehicle speed, the estimation precision of the particulate matter deposit amount in the DPF 1 according to the differential pressure method is lower than that of the accumulation method.

Further, the detected temperatures of the upstream temperature sensor 4 and downstream temperature sensor 5 are used to calculate the exhaust gas flow rate Qexh according to the differential pressure method, but temperature sensors typically have poor responsiveness.

Variation in the exhaust gas flow rate generally accompanies variation in the exhaust gas temperature. In the calculation method of the exhaust gas flow rate Qexh described above, the exhaust gas temperature is used as a parameter, and therefore when the exhaust gas flow rate changes suddenly, a time lag occurs in the calculation result. Hence when the exhaust gas flow rate changes suddenly, the estimation precision of the particulate matter deposit amount in the DPF 1 according to the differential pressure method deteriorates.

In response to these characteristics of the differential pressure method and accumulation method, the controller 3 applies estimation using the differential pressure method and estimation using the accumulation method to estimation of the particulate matter deposit amount in the DPF 1 selectively, in accordance with the running conditions.

Here, in the differential pressure method, the particulate matter deposit amount can be calculated directly from running condition data at that point in time, whereas in the accumulation method, the particulate matter deposit amount is calculated by adding the deposit amount per unit time to past particulate matter deposit amounts. Hence, when switching from the differential pressure method to the accumulation method, the accumulation method is applied by adding the deposit amount per unit time to the particulate matter deposit amount calculated according to the differential pressure method at the time of switching. When switching from the accumulation method to the differential pressure method, the particulate matter deposit amount calculated by the differential pressure method is applied immediately in place of the particulate matter deposit amount calculated by the accumulation method.

Next, referring to FIG. 2, a particulate matter deposit amount estimation routine executed by the controller 3 to estimate the particulate matter deposit amount will be described. The controller 3 executes this routine at intervals of ten milliseconds while the diesel engine 10 is operative.

In a step S1, the controller 3 determines whether or not the vehicle speed detected by the vehicle speed sensor 13 exceeds forty kilometers per hour. As described above, when the particulate matter deposit amount is estimated using the differential pressure method, precision deteriorates as the vehicle speed decreases, and below a certain vehicle speed, the particulate matter deposit amount estimation precision falls below that of the accumulation method. The vehicle speed of forty kilometers per hour applied in the step S1 is an example of this boundary vehicle speed.

In reality, the boundary vehicle speed is dependent on the characteristics of the differential pressure sensor 2 and diesel engine 10, and is therefore determined through experiment or simulation. When the determination of the step S1 is affirmative, the controller 3 performs the processing of a step S2, and when negative, the controller 3 executes steps S12–S14 to calculate the particulate matter deposit amount according to the accumulation method.

In the step S2, the controller 3 determines whether or not a vehicle speed rate of change $\Delta$VSP is lower than a threshold TS2. As described above, when the exhaust gas flow rate changes suddenly, the precision with which the particulate matter deposit amount in the DPF 1 is estimated using the differential pressure method deteriorates.

Here, the exhaust gas flow rate varies linearly in accordance with variation in the vehicle speed. Hence, when comparing the differential pressure method and accumulation method in relation to the particulate matter deposit amount estimation precision, a boundary rate of change in the exhaust gas flow rate at which the precision reverses is expressed as the vehicle speed rate of change, and this is set as the threshold TS2. The reason for using the vehicle speed rate of change is that it is easier to calculate the vehicle speed rate of change than the rate of change in the exhaust gas flow rate. The specific numerical value of the threshold TS2 is determined through experiment or simulation, but may be one to two kilometers per hour per second, for example.

When the determination in the step S2 is affirmative, the controller 3 performs the processing of a step 3, and when negative, the controller 3 executes the steps S12–S14 to calculate the particulate matter deposit amount according to the accumulation method.

In the step S3, the controller 3 determines whether or not the vehicle speed VSP is equal to or lower than a reference vehicle speed Vtc. The reference vehicle speed Vtc is a vehicle speed that is stored in the non-volatile memory 20 in a step S9 to be described below. Here, the controller 3 performs the determination by reading the reference vehicle speed Vtc stored in the non-volatile memory 20 during the previous execution of the step S9.

When the determination of the step S3 is affirmative, the controller 3 performs the processing of a step S4, and when negative, the controller 3 executes steps S8–S10 to calculate the particulate matter deposit amount according to the differential pressure method.

In the step S4, the controller 3 determines whether or not an elapsed time from a set time Ttc to a current time T is less than a threshold TS1. The set time Ttc is a time that is stored in the non-volatile memory 20 in the step S9 to be described below. Here, the controller 3 performs the determination by reading the set time Ttc stored in the non-volatile memory 20 during the previous execution of the step S9. The threshold TS1 denotes a time span in which the particulate matter deposit amount shows substantially no change. The threshold TS1 is set to several minutes. The meaning of the processing of the step S4 will be described later.

When the determination in the step S4 is affirmative, the controller 3 executes steps S5–S7 to calculate the particulate matter deposit amount according to the accumulation method. When the determination in the step S4 is negative, the controller 3 executes the steps S8–S10 to calculate the particulate matter deposit amount according to the differential pressure method.

Figure 9:
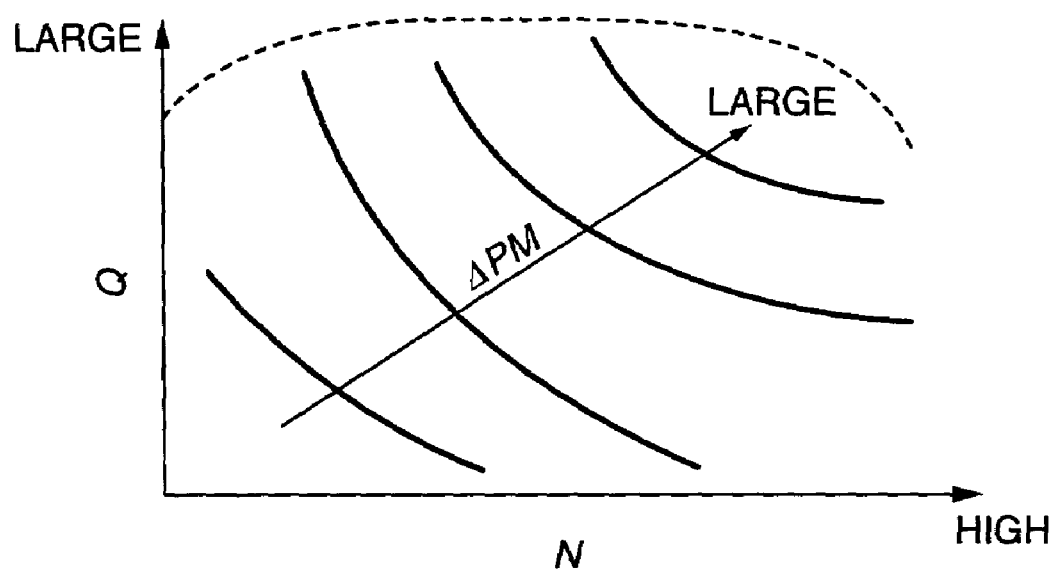
FIG. 9 is a diagram illustrating the characteristics of a map of a particulate matter deposit amount per unit time, which is used in an accumulation method.

In the step S5, the controller 3 refers to the map having the characteristics shown in FIG. 9, which is stored in the ROM in advance, to determine a particulate matter deposit amount $\Delta$PM per unit time on the basis of the fuel injection amount Q and rotation speed N of the diesel engine 10. By setting the unit time to equal the execution interval of the routine, $\Delta$PM equals the particulate matter deposit amount during the period from the previous execution of the routine to the current execution of the routine.

In consideration of error, the map is set to provide slightly larger values than the actual particulate matter deposit amount per unit time. If the particulate matter deposit amount is estimated too low, the particulate matter deposit amount at the beginning of regeneration of the DPF 1 exceeds the predetermined amount at which regeneration should begin, and the excessive heat generated by combustion of the excessive particulate matter deposit amount may damage the filter material of the DPF 1. Providing slightly larger values on the map is useful for preventing such problems.

Next, in the step S6, the controller 3 calculates an estimated value PMb of the particulate matter deposit amount by adding the particulate matter deposit amount $\Delta$PM per unit time, determined in the step S5, to a previous value PMbz stored in the non-volatile memory 20.

Next, in the step S7, the controller 3 stores the estimated value PMb in the non-volatile memory 20 as the previous value PMbz to be used in the next execution of the routine.

Following the processing of the step S7, the controller 3 performs the processing of a step S11.

Meanwhile, estimation of the particulate matter deposit amount according to the differential pressure method in the steps S8–S10 is performed as follows.

In the step S8, the controller 3 calculates the exhaust gas flow rate Qexh of the DPF 1 from the differential pressure $\Delta$P upstream and downstream of the DPF 1, the intake air flow rate, the exhaust gas temperature in the DPF 1, and the fuel injection amount Q of the diesel engine 10, as described above. Then, the controller 3 refers to the map having the characteristics shown in FIG. 8, stored in the ROM in advance, to determine an estimated value PMa of the particulate matter deposit amount on the basis of the differential pressure $\Delta$P and the exhaust gas flow rate Qexh. Numerical values are set on the map in advance to provide slightly larger values than the actual deposit amount.

Next, in the step S9, the controller 3 stores the current vehicle speed VSP and current time T in the non-volatile memory 20 as the reference vehicle speed Vtc and the set time Ttc respectively. The step S9 is only performed when estimating the particulate matter deposit amount by the differential pressure method. Accordingly, the set time Ttc denotes the time at which estimation of the particulate matter deposit amount by the differential pressure method was last performed.

The step S4 described above is executed to determine whether or not the elapsed time following the latest estimation of the particulate matter deposit amount using the differential pressure method has reached the threshold TS1, or in other words whether or not the differential pressure method was applied immediately beforehand.

Next, in the step S10, the controller 10 stores the estimated value PMa of the particulate matter deposit amount in the non-volatile memory 20 as the previous value PMbz to be used in the next execution of the routine. The estimated value PMa of the particulate matter deposit amount itself may also be used in subsequent executions of the routine, and therefore the estimated value PMa is also stored in the non-volatile memory 20.

Following the processing of the step S7 or the step S10, the controller 3 sets the estimated value PMa of the particulate matter deposit amount, determined in the step S8, as a particulate matter deposit amount output value PM in the step S11. The significance of the processing performed in the step S1 will be described in detail hereafter. Following the step S11, the controller 3 terminates the routine.

The particulate matter deposit amount calculation process according to the accumulation method in the steps S12–S14 is identical to the process in the steps S5–S7, and hence description thereof has been omitted.

Following the processing of the step S14, the controller 3 sets the estimated value PMb of the particulate matter deposit amount, calculated in the step S13, as the particulate matter deposit amount output value PM in a step S15. Following the processing of the step S15, the controller 3 terminates the routine.

In this routine, the differential pressure method of the steps S8-S10 is applied to estimation of the particulate matter deposit amount when the vehicle speed exceeds forty kilometers per hour, and when the vehicle speed rate of change ΔVSP is smaller than the threshold TS2.

Even in these cases, if the vehicle speed VSP falls below the reference vehicle speed Vtc stored in the non-volatile memory 20 before the elapsed time following application of the differential pressure method reaches the threshold TS1, the particulate matter deposit amount is calculated according to the accumulation method in the steps S5–S7. In other words, if the vehicle speed VSP falls during application of the differential pressure method, the estimated value PMb of the particulate matter deposit amount according to the accumulation method is calculated instead of the estimated value PMa of the particulate matter deposit amount according to the differential pressure method until the duration of the reduced vehicle speed state reaches the threshold TS1.

However, the estimated value PMb of the particulate matter deposit amount calculated in the steps S5–S7 according to the accumulation method is not output, and instead the estimated value PMa of the particulate matter deposit amount stored in the non-volatile memory 20 is set as the output value PM.

In other words, when the vehicle speed decreases during application of the differential pressure method, the estimated value PMa of the particulate matter deposit amount that was estimated according to the differential pressure method prior to the decrease in the vehicle speed VSP is output as is as the output value PM until an amount of time corresponding to the threshold TS1 elapses. As described above, the numerical values of the estimated value PMa of the particulate matter deposit amount, calculated according to the differential pressure method, are set to slightly larger values on the map than the actual deposit amount. Hence, as long as the speed reduction ends after a short time period, the estimated value PMa of the particulate matter deposit amount prior to the speed reduction can be output with no great error occurring between the estimated amount and actual deposit amount.

When the duration of the speed reducing state exceeds the threshold TS1, calculation of the estimated value PMa of the particulate matter deposit amount using the differential pressure method in the steps S8–S10 resumes, and the calculation result is set as the output value PM.

The reason for calculating the estimated value PMb of the particulate matter deposit amount using the accumulation method in the steps S5 and S6 during the period lasting until the elapsed time following application of the differential pressure method reaches the threshold TS1, even though the calculation result is not output during this period, is as follows.

The processing of the steps S5–S7 is performed only when the determination of the step S4 is affirmative. In this case, the previous value PMbz is not updated in the step S10. In this state, when the determination of the step S1 or S2 becomes negative, the particulate matter deposit amount is calculated subsequently according to the accumulation method in the steps S12–S14.

As the previous value PMbz used in the step S12 immediately after the switch, the value of PMbz updated immediately beforehand in the step S7 is more accurate than the value of PMbz obtained in the step S10 when updating is halted. In other words, the particulate matter deposit amount estimated value PMb is calculated in the steps S5 and S6, and the result of the calculation is stored in the non-volatile memory 20 in the step S7, to ensure the accuracy of the previous value PMbz serving as an initial value upon application of the accumulation method in the steps S12–S15.

The steps S5–S7 are executed only during the brief time period lasting until the duration of the speed reducing state of the vehicle reaches the threshold TS1. Therefore, the steps S5–S7 may be omitted, and the processing of the step S11 may be performed as soon as the step S4 becomes affirmative. In this case, when switching from the differential pressure method of the steps S8–S10 to the accumulation method of the steps S12–S14, the previous value PMbz used to calculate the particulate matter deposit amount estimated value PMb in the step S13, which is performed immediately after the switch, takes the value stored in the non-volatile memory 20 in the step S10 during application of the differential pressure method.

Figures 3A, 3B:
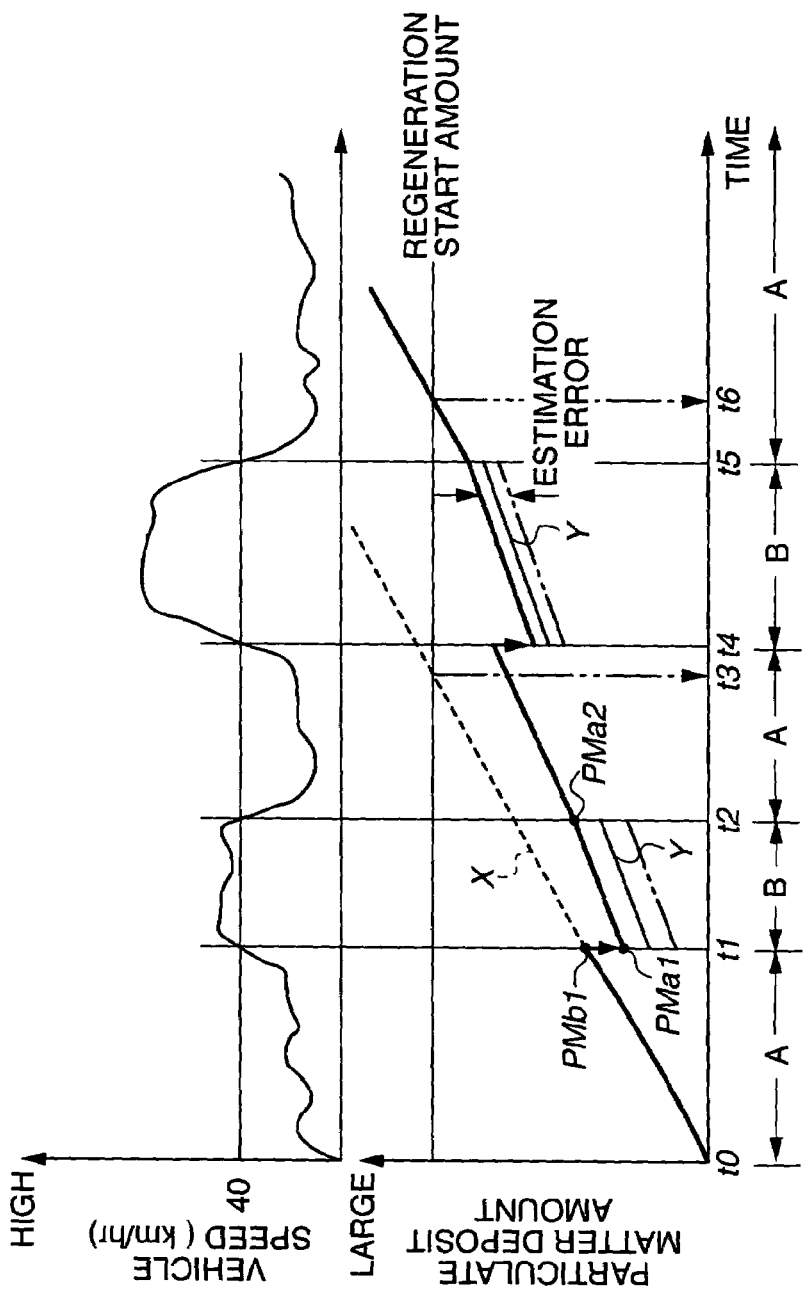
FIGS. 3A and 3B are timing charts illustrating variation in a vehicle speed and an estimated value of the particulate matter deposit amount as a result of execution of the particulate matter deposit amount estimation routine.

Referring to FIGS. 3A and 3B, variation in the particulate matter deposit amount in the DPF 1, which is estimated by executing the above routine, will be described.

The diesel engine 10 is started up at a time t0, and the vehicle begins to advance. The particulate matter deposit amount is estimated using the accumulation method by executing the steps S12–S15 until the vehicle speed reaches forty kilometers per hour. The previous value PMbz used initially in the step S13 at the time t0 is the value stored in the non-volatile memory 20 at the end of the previous operation of the diesel engine 10. Here, it is assumed that the previous value PMbz at the time t0 is zero.

When the vehicle speed exceeds forty kilometers per hour, the determination of the step S1 becomes affirmative. Furthermore, when the vehicle speed rate of change ΔVSP falls below the threshold TS2 in the step S2 and the vehicle speed VSP is larger than the reference vehicle speed Vtc in the step S3, the method of estimating the particulate matter deposit amount is switched at a time t1. More specifically, the particulate matter deposit amount is estimated using the differential pressure method in the steps S8–S10 instead of the steps S12–S15.

Since the differential pressure method does not depend on the previous value PMbz, the estimated value of the particulate matter deposit amount changes in stepped fashion following the switch from a deposit amount PMb1 according to the accumulation method to a deposit amount PMa1 according to the differential pressure method.

The particulate matter deposit amount is estimated using the differential pressure method until a time t2, at which the vehicle speed falls below forty kilometers per hour. As described above, the map of the particulate matter deposit amount estimated value PMa used in the differential pressure method provides slightly larger values than the actual deposit amount, and therefore the straight line linking the estimated values PMb1 and PMb2 is always slightly higher than an actual deposit amount Y.

At a time t2, after the vehicle speed has fallen below forty kilometers per hour, the particulate matter deposit amount is estimated using the accumulation method by executing the steps S12–S15 again. At the time t2, the previous value PMbz applied in the step S13 is the value set in the step S10 of the differential pressure method which ended immediately beforehand. In the accumulation method, this previous value PMbz is used as the starting point for accumulation of the deposit amount, and hence when switching from the differential pressure method to the accumulation method, no step occurs in the estimated particulate matter deposit amount.

Thereafter, the particulate matter deposit amount is estimated while switching between the accumulation method and differential pressure method according to variation in the vehicle speed. At a time t6, the output value PM of the particulate matter deposit amount reaches the predetermined amount at which regeneration is to be performed, and hence the controller 3 executes regeneration of the DPF 1 by executing another routine.

The processing relating to a temporary speed reduction in the vehicle during application of the differential pressure method is not shown in FIGS. 3A and 3B. As described above, when the vehicle speed decreases during application of the differential pressure method, the output value PM is maintained at the value of PMa prior to the speed reduction until the duration of the speed reduction reaches the threshold TS1, and at the same time, the steps S5–S7 are executed to update the previous value PMbz used in the accumulation method. As a result, the output value PM remains stable even when the vehicle speed varies frequently during application of the differential pressure method, while the accuracy of the previous value PMbz used after switching to the accumulation method is not affected adversely.

The broken line X in the drawing illustrates variation in the particulate matter deposit amount estimated using the accumulation method alone. The accumulation method exhibits favorable estimation precision at low vehicle speeds, but at high vehicle speeds, the estimation precision falls below that of the differential pressure method. Accordingly, if the accumulation method continues to be used to estimate the particulate matter deposit amount even after the vehicle speed exceeds forty kilometers per hour, the error in the estimated deposit amount accumulates as shown by the broken line X in the drawing such that the estimated deposit amount reaches the predetermined amount for beginning regeneration at a time t3. In contrast, when the accumulation method and differential pressure method are applied selectively according to the vehicle speed, a favorable estimation precision of the particulate matter deposit amount can be realized.

Next, referring to FIG. 4, a second embodiment of this invention will be described.

Figure 2:
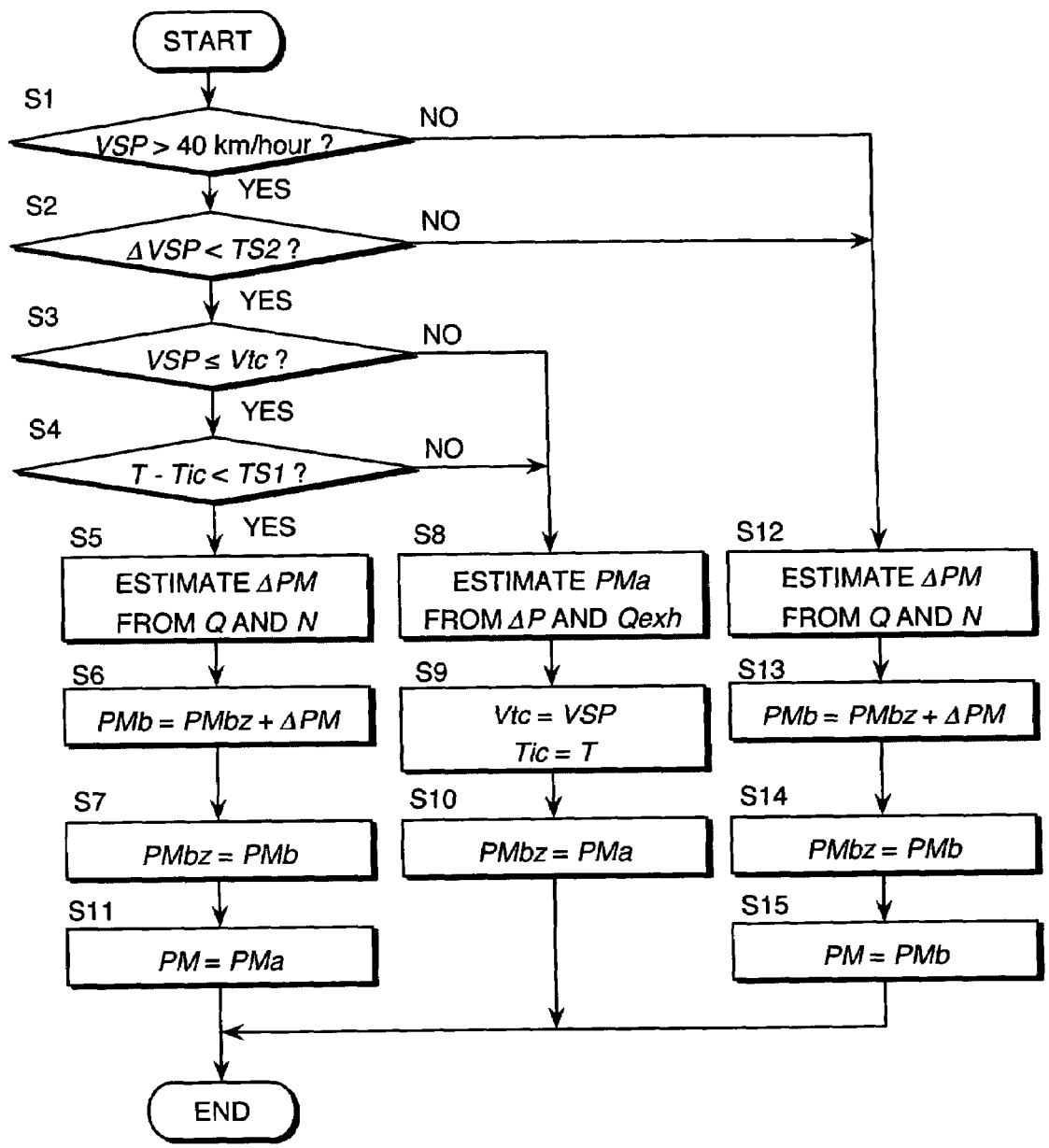
FIG. 2 is a flowchart illustrating a particulate matter deposit amount estimation routine, which is executed by a controller according to this invention.
Figure 4:
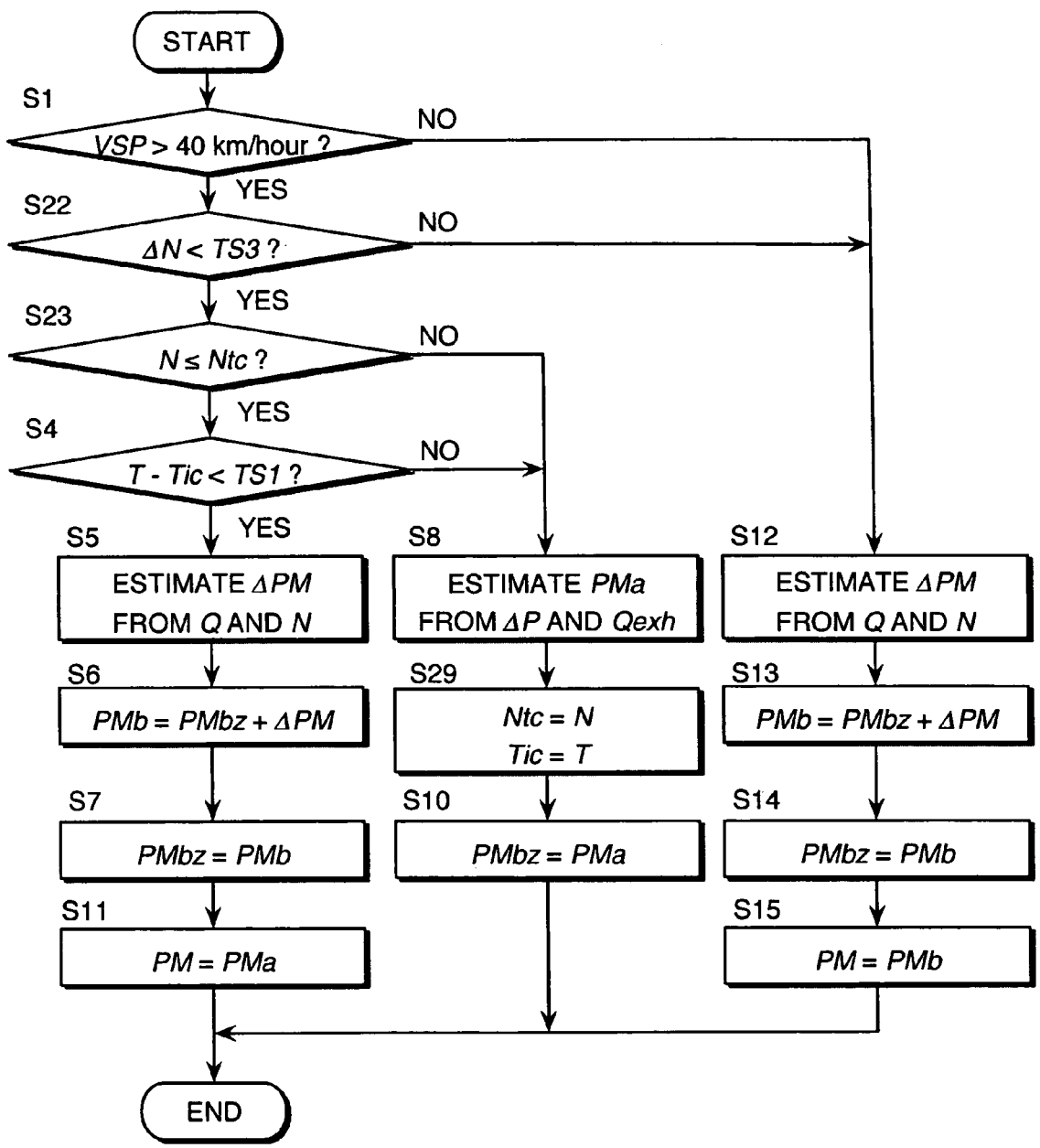
FIG. 4 is similar to FIG. 2, but shows a second embodiment of this invention.

The hardware constitution of the second embodiment is identical to that of the first embodiment, but the second embodiment differs from the first embodiment in that a routine shown in FIG. 4 is executed instead of the particulate matter deposit amount estimation routine of FIG. 2. The execution conditions of this routine are identical to those of the routine in FIG. 2. The differences between this routine and the routine of FIG. 2 relate to the conditions for switching between the accumulation method and differential pressure method. More specifically, in this routine, steps S22, S23, and S29 are provided in place of the steps S2, S3, and S9 in the routine of FIG. 2, respectively. The other steps are identical to those of the routine in FIG. 2.

In the step S22, the controller 3 determines whether or not a rate of change $\Delta N$ in the engine rotation speed exceeds a threshold TS3. The threshold TS3 has the same significance as the threshold TS2 relating to the vehicle speed rate of change $\Delta VSP$. That is, when comparing the differential pressure method and accumulation method in relation to the estimation precision of the particulate matter deposit amount, the boundary rate of change in the exhaust gas flow rate at which the precision reverses is a value expressed as the rate of change $\Delta N$ in the engine rotation speed. The specific numerical value of the threshold TS3 is determined through experiment or simulation.

In the step S23, a determination is made as to whether or not the engine rotation speed N is equal to or lower than a reference engine rotation speed Ntc.

In the step S29, the controller 3 stores the current engine rotation speed N and current time T in the non-volatile memory 20 as the reference engine rotation speed Ntc and set time Ttc respectively.

In this embodiment, the rate of change $\Delta N$ in the engine rotation speed is used instead of the vehicle speed rate of change $\Delta VSP$ used in the first embodiment as a parameter for switching between the accumulation method and differential pressure method. As described above, when the exhaust gas flow rate changes suddenly, the estimation precision of the differential pressure method deteriorates, and it is therefore preferable to apply the accumulation method. In this embodiment, this condition is determined according to the engine rotation speed rate of change $\Delta N$ rather than the vehicle speed rate of change $\Delta VSP$.

As regards estimation of the particulate matter deposit amount in the DPF 1, similar favorable effects to those of the first embodiment, shown in FIGS. 3A and 3B, can also be obtained in this embodiment.

Next, referring to FIG. 5, a third embodiment of this invention will be described.

Figure 5:
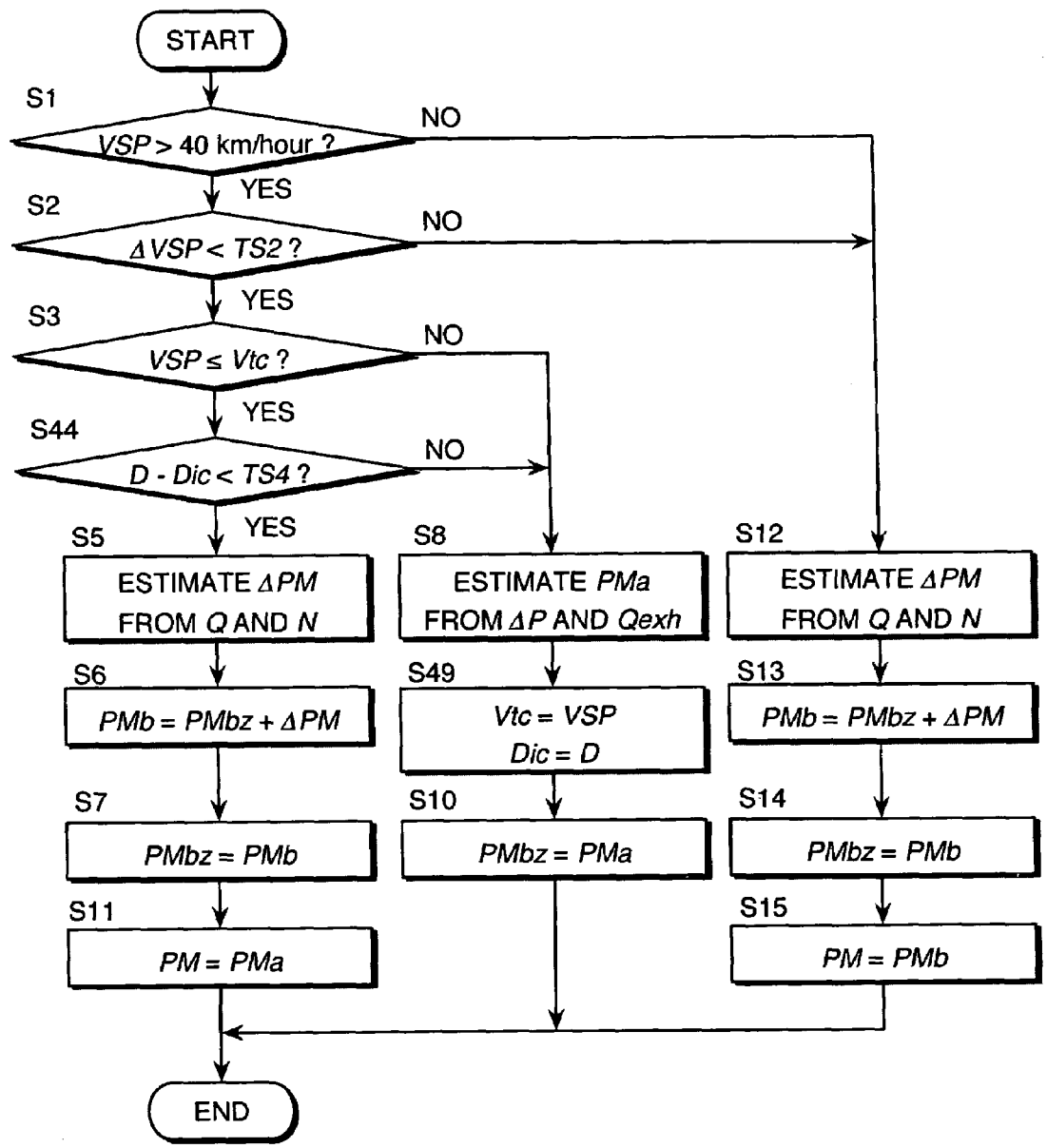
FIG. 5 is similar to FIG. 2, but shows a third embodiment of this invention.

The hardware constitution of the third embodiment is identical to that of the first embodiment, but the third embodiment differs from the first embodiment in that a routine shown in FIG. 5 is executed instead of the particulate matter deposit amount estimation routine of FIG. 2. The execution conditions of this routine are identical to those of the routine in FIG. 2. The differences between this routine and the routine of FIG. 2 relate to processing performed when the running conditions change to accumulation method application conditions immediately after application of the differential pressure method. More specifically, in this routine, steps S44 and S49 are provided in place of the steps S4 and S9 in the routine of FIG. 2, respectively. The other steps are identical to those of the routine in FIG. 2.

In the step S44, the controller 3 determines whether or not the difference between a traveled distance D of the vehicle at the present time, detected by the odometer 15, and a reference traveled distance Dtc is lower than a threshold TS4. The difference between the traveled distance D at the present time and the reference traveled distance Dtc shows the distance traveled by the vehicle following the latest estimation of the particulate matter deposit amount using the differential pressure method. In the step S4 of the routine in FIG. 2, the elapsed time following the latest estimation of the particulate matter deposit amount using the differential pressure method is used to determine whether or not the differential pressure method was applied immediately beforehand. In this routine, the same determination is made on the basis of the traveled distance of the vehicle. The threshold TS4 expresses the threshold TS1, relating to the elapsed time, in terms of the distance traveled by the vehicle.

After estimating the particulate matter deposit amount PMa using the differential pressure method in the step S8, the controller 3 stores the current vehicle speed VSP and current traveled distance D of the vehicle in the non-volatile memory 20 as the reference vehicle speed Vtc and reference traveled distance Dtc, respectively, in the step S49.

As regards estimation of the particulate matter deposit amount in the DPF 1, similar favorable effects to those of the first embodiment, shown in FIGS. 3A and 3B, can also be obtained in this embodiment.

Figure 6:
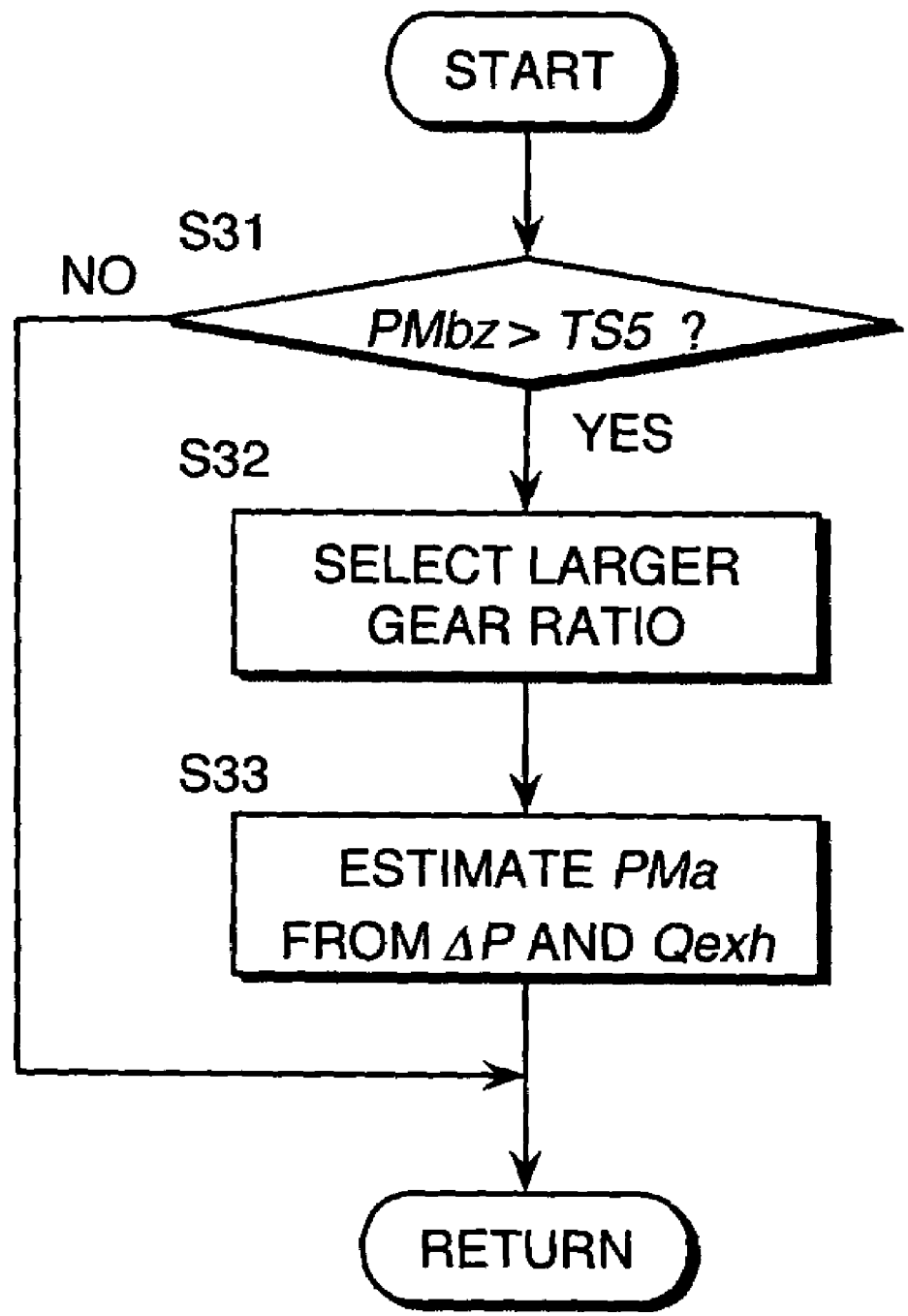
FIG. 6 is a flowchart illustrating a particulate matter deposit amount estimation subroutine according to a differential pressure method of a fourth embodiment of this invention.

Next, referring to FIG. 6, a fourth embodiment of this invention will be described.

This embodiment relates to calculation of the particulate matter deposit amount using the differential pressure method, which is performed in the step S8 of the first through third embodiments. In this embodiment, a subroutine shown in FIG. 6 is executed in the step S8.

First, in a step S31, a determination is made as to whether or not the previous value PMbz of the particulate matter deposit amount stored in the non-volatile memory 20 exceeds a threshold TS5. The threshold TS5 takes a slightly smaller value than the predetermined amount set as the particulate matter deposit amount for beginning regeneration of the DPF 1. Here, the threshold TS5 is set at ninety percent of the predetermined amount for beginning regeneration. The step S31 is performed to determine whether or not the DPF 1 is approaching the regeneration timing. When the determination of the step S31 is affirmative, the controller 3 increases the gear ratio of a transmission provided in the vehicle in a step S32. In other words, a downshift is performed. By performing a downshift, the rotation speed of the diesel engine 10 is increased, and the exhaust gas flow rate is increased.

When the determination of the step S31 is negative, or when the processing of the step S32 is complete, in a step S33 the controller 3 estimates the particulate matter deposit amount according to the differential pressure method by means of the same process as that performed in the step S8 of the first through third embodiments.

According to this embodiment, when applying the differential pressure method, a determination is made as to whether or not the regeneration timing of the DPF 1 is near, and if the regeneration timing is near, the exhaust gas flow rate is increased by performing a downshift. As described above, the differential pressure method exhibits favorable estimation precision when the exhaust gas flow rate is large. Hence, by increasing the exhaust gas flow rate when the regeneration timing of the DPF 1 is near and then estimating the particulate matter deposit amount, the estimation precision of the deposit amount can be improved, and the regeneration timing can be determined correctly.

This embodiment may be combined with any of the first through third embodiments.

The contents of Tokugan 2004-233191, with a filing date of Aug. 10, 2004 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in each of the above embodiments, the parameters required for the estimation of the particulate matter deposit amount of DPF 1 are detected using sensors, but this invention can be applied to any estimation device which can perform the claimed estimation using the claimed parameters regardless of how the parameters are acquired.

The embodiments of this invention in which an exclusive property or privilege is claimed are defined as follows:

1. An estimation device which estimates a particulate matter deposit amount in a diesel particulate filter provided in an exhaust passage of a diesel engine for a vehicle, comprising:
    a differential pressure sensor means which detects a differential pressure between an exhaust gas pressure in the exhaust passage upstream of the filter and an exhaust gas pressure in the exhaust passage downstream of the filter;
    a sensor means which detects a running condition of the diesel engine;
    a sensor means which detects a parameter associated with an exhaust gas flow rate in the filter; and
    a programmable controller programmed to:
    estimate the particulate matter deposit amount in the filter by applying a first estimation method in which the particulate matter deposit amount is estimated on the basis of the differential pressure, and a second estimation method in which a periodical increment in the particulate matter deposit amount is calculated on the basis of the running condition and the particulate matter deposit amount is calculated by accumulating the increment, selectively in accordance with the parameter; and
    set the particulate matter deposit amount estimated in the first estimation method as an initial value for starting accumulation when applying the second estimation method.

2. The estimation device as defined in claim 1, wherein the controller is further programmed to apply the first estimation method when the parameter is greater than a predetermined value, and apply the second estimation method when the parameter is not greater than the predetermined value.

3. The estimation device as defined in claim 2, wherein the predetermined value is set such that when the parameter is greater than the predetermined value, an estimation precision of the first estimation method exceeds an estimation precision of the second estimation method, and when the parameter is smaller than the predetermined value, the estimation precision of the first estimation method is lower than the estimation precision of the second estimation method.

4. The estimation device as defined in claim 2, wherein the parameter is a vehicle speed.

5. The estimation device as defined in claim 4, wherein the controller is further programmed to apply the second estimation method when a rate of change in the vehicle speed exceeds a predetermined threshold, even if the vehicle speed is greater than the predetermined value.

6. The estimation device as defined in claim 5, wherein the estimation device further comprises a sensor means which detects an engine rotation speed of the diesel engine, and the controller is further programmed to apply the second estimation method when a rate of change in the engine rotation speed exceeds a predetermined threshold, even if the vehicle speed is greater than the predetermined value.

7. The estimation device as defined in claim 4, wherein the controller further comprises a non-volatile memory which stores the estimated particulate matter deposit amount.

8. The estimation device as defined in claim 7, wherein the controller is further programmed to output a value stored in the non-volatile memory as the particulate matter deposit amount when the vehicle speed decreases within a predetermined time period following execution of the first estimation method.

9. The estimation device as defined in claim 8, wherein the controller is further programmed to estimate a second particulate matter deposit amount by applying the second estimation method when the vehicle speed decreases within the predetermined time period following execution of the first estimation method, and accumulate the increment according to the second estimation method using the second particulate matter deposit amount as the initial value when the vehicle speed falls below the predetermined value.

10. The estimation device as defined in claim 7, wherein the controller is further programmed to output a value stored in the non-volatile memory as the particulate matter deposit amount when the engine rotation speed decreases within a predetermined time period following execution of the first estimation method.

11. The estimation device as defined in claim 10, wherein the controller is further programmed to estimate a second particulate matter deposit amount by applying the second estimation method when the engine rotation speed decreases within the predetermined time period following execution of the first estimation method, and accumulate the increment according to the second estimation method using the second particulate matter deposit amount as the initial value when the vehicle speed falls below the predetermined value.

12. The estimation device as defined in claim 7, wherein the controller is further programmed to output a value stored in the non-volatile memory as the particulate matter deposit amount when the vehicle speed decreases within a predetermined traveled distance following execution of the first estimation method.

13. The estimation device as defined in claim 12, wherein the controller is further programmed to estimate a second particulate matter deposit amount by applying the second estimation method when the vehicle speed decreases within the predetermined traveled distance following execution of the first estimation method and accumulate the increment according to the second estimation method using the second particulate matter deposit amount as the initial value when the vehicle speed falls below the predetermined value.

14. The estimation device as defined in claim 7, wherein the diesel engine comprises an engine which drives a vehicle via a transmission, and the controller is further programmed to determine whether or not the particulate matter deposit amount in a non-volatile memory exceeds a predetermined deposit amount prior to execution of the first estimation method, and downshift the transmission when the particulate matter deposit amount in the non-volatile memory exceeds the predetermined deposit amount.

15. The estimation device as defined in claim 1, wherein the first estimation method comprises a method in which the particulate matter deposit amount is estimated on the basis of the differential pressure and the exhaust gas flow rate in such a way that an estimated particulate matter deposit amount increases as the exhaust gas flow rate decreases and the differential pressure increases.

16. The estimation device as defined in claim 1, wherein the sensor means which detects the running condition comprises a sensor which detects an engine load of the diesel engine, and a sensor which detects an engine rotation speed of the diesel engine, and the second estimation method comprises a method in which the increment is estimated on the basis of the engine load and the engine rotation speed in such a way that the increment increases as the engine load increases and the engine rotation speed increases, and the particulate matter deposit amount is estimated by accumulating the estimated increment.

17. An estimation device which estimates a particulate matter deposit amount in a diesel particulate filter provided in an exhaust passage of a diesel engine for a vehicle, comprising:

means for detecting a differential pressure between an exhaust gas pressure in the exhaust passage upstream of the filter and an exhaust gas pressure in the exhaust passage downstream of the filter;

means for detecting a running condition of the diesel engine;

means for detecting a parameter associated with an exhaust gas flow rate in the filter;

means for estimating the particulate matter deposit amount in the filter by applying a first estimation method in which the particulate matter deposit amount is estimated on the basis of the differential pressure, and a second estimation method in which a periodical increment in the particulate matter deposit amount is calculated on the basis of the running condition and the particulate matter deposit amount is calculated by accumulating the increment, selectively in accordance with the parameter; and means for setting the particulate matter deposit amount estimated in the first estimation method as an initial value for starting accumulation when applying the second estimation method.

18. An estimation method which estimates a particulate matter deposit amount in a diesel particulate filter provided in an exhaust passage of a diesel engine for a vehicle, comprising:

detecting a differential pressure between an exhaust gas pressure in the exhaust passage upstream of the filter and an exhaust gas pressure in the exhaust passage downstream of the filter;

detecting a running condition of the diesel engine;

detecting a parameter associated with an exhaust gas flow rate in the filter;

estimating the particulate matter deposit amount in the filter by applying a first estimation method in which the particulate matter deposit amount is estimated on the basis of the differential pressure, and a second estimation method in which a periodical increment in the particulate matter deposit amount is calculated on the basis of the running condition and the particulate matter deposit amount is calculated by accumulating the increment, selectively in accordance with the parameter; and setting the particulate matter deposit amount estimated in the first estimation method as an initial value for starting accumulation when applying the second estimation method.

* * * * *